United States Patent Office 3,272,808
Patented Sept. 13, 1966

3,272,808
N-[3-(4-AMINOMETHYL-4-PHENYLPIPERIDINO) PROPYL]PHENOTHIAZINES AND THEIR CARBAMATES
Harman S. Lowrie, Glenview, Ill., assignor to G. D. Searle & Co., Chicago, Ill., a corporation of Delaware
No Drawing. Filed July 29, 1963, Ser. No. 298,431
4 Claims. (Cl. 260—243)

The present invention relates to certain N-[3-(4-aminomethyl - 4 - phenylpiperidino)propyl]phenothiazines and their carbamates. More particularly, it relates to compounds having the following general formula

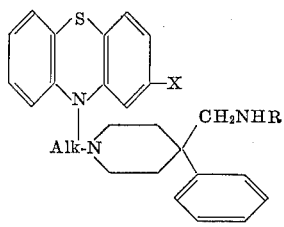

wherein Alk is a lower alkylene radical; R is selected from the group consisting of hydrogen and (lower alkoxy)-carbonyl; and X is selected from the group consisting of halogen and lower alkanoyl. The lower alkylene radicals referred to above contain up to six carbon atoms and can be exemplified by ethylene, trimethylene, and tetramethylene, although trimethylene is preferred. The (lower alkoxy)carbonyl radicals referred to above are exemplified by methoxycarbonyl, ethoxycarbonyl, propoxycarbonyl, and like radicals wherein the alkoxy portion contains up to six carbon atoms. The halogen radicals referred to above include fluorine, chlorine, bromine, and iodine. The lower alkanoyl radicals referred to above are straight-chain or branched radicals containing up to six carbon atoms and are exemplified by acetyl, propionyl, and butyryl.

Equivalent to the basic amines of this invention for the purposes here described are their non-toxic acid addition salts and quaternary ammonium salts. Such salts are formed with a variety of inorganic and strong organic acids including sulfuric, phosphoric, hydrochloric, citric, maleic, and related acids. Quaternary ammonium salts are formed with a variety of organic esters of sulfuric, hydrohalic, and aromatic sulfonic acids. Among such esters are methyl chloride and bromide, ethyl chloride, propyl chloride, dimethyl sulfate, methyl benzenesulfonate, ethylene chlorohydrin, and allyl bromide.

The compounds of this invention are useful because of their valuable pharmacological properties. More particularly, these compounds possess anti-inflammatory activity as demonstrated by their phenylbutazone-like effect on edematous conditions. In addition, the free amines of the present invention possess hypocholesterolemic activity; they possess anti-bacterial and anti-algal activity as demonstrated by their inhibition of the growth of the organisms *Diplococcus pneumoniae* and *Chlorella vulgaris* and they inhibit germination of seeds of trifolium.

The compounds of this invention can be prepared by heating the appropriate 10-haloalkylphenothiazine with an appropriately substituted piperidine corresponding to the following formula

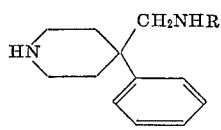

wherein R is (lower alkoxy)carbonyl. Butanone is a convenient solvent for carrying out the reaction, but other inert solvents such as ethanol and benzene can also be used. The free amine can then be obtained either by saponification of the carbamate or by reduction of the carbamate. Thus, treatment of the carbamate with lithium aluminum hydride can be used to obtain the corresponding amine.

The compounds which constitute this invention and their preparation will appear more fully from a consideration of the following examples which are given for the purpose of illustration only and are not to be construed as limiting the invention in spirit or in scope. In these examples, quantities are indicated in parts by weight and temperatures in degrees centigrade (° C.).

Example 1

A mixture of 17 parts of 2-propionyl-10-(3-chloropropyl)phenothiazine, 10 parts of triethylamine, 6.6 parts of 4-ethoxycarbonylaminomethyl - 4 - phenylpiperidine, 3 parts of sodium iodide and 320 parts of 2-butanone is stirred and refluxed for 15 hours. The reaction mixture is then filtered and the solvent is removed under reduced pressure. The resultant residue is dissolved in ether, and the ether solution is washed first with dilute potassium hydroxide solution and then with water before it is extracted with dilute hydrochloric acid. The acid extract is made alkaline and the resultant mixture is extracted with ether. This ether extract is dried over anhydrous potassium carbonate and the solvent is then evaporated to leave a residual orange oil which is 1-[3-(2-propionyl-10-phenothiazinyl)propyl]-4-ethoxycarbonylaminomethyl-4 - phenylpiperidine. This compound has the following formula

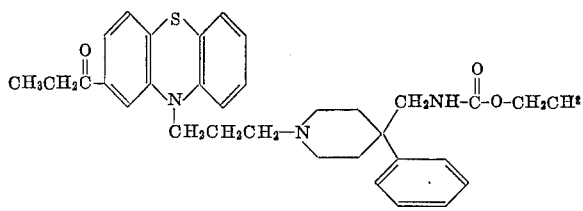

Example 2

If an equivalent quantity of 2-acetyl-10-(3-chloropropyl)phenothiazine is substituted for the 2-propionyl-10-(3-chloropropyl)phenothiazine and the procedure described in Example 1 is repeated, the product obtained is 1-[3-(2-acetyl-10-phenothiazinyl)propyl]-4-ethoxycarbonylaminomethyl-4-phenylpiperidine.

Example 3

An equivalent quantity of 4-methoxycarbonylaminomethyl-4-phenylpiperidine is substituted for the 6.6 parts of 4-ethoxycarbonylaminomethyl-4-phenylpiperidine and the procedure described in Example 1 is repeated. In this case, the product is 1-[3-(2-propionyl-10-phenothiazinyl) propyl]-4-methoxycarbonylaminomethyl-4 - phenylpiperidine. This compound has the following formula

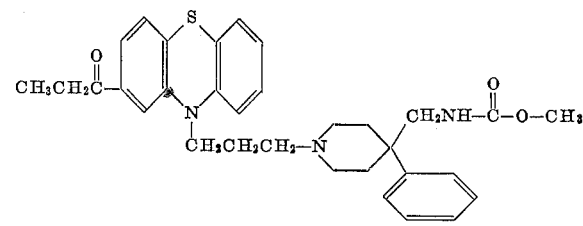

Example 4

When an equivalent quantity of 2-chloro-10-(3-chloropropyl)phenothiazine is substituted for the 2-propionyl-10-(3-chloropropyl)phenothiazine and the procedure of Example 1 is repeated, the product is 1-[3-(2-chloro-10- phenothiazinyl)propyl]-4 - ethoxycarbonylaminomethyl-4-phenylpiperidine. This product is obtained as a brown oil.

*Example 5*

A solution of 21 parts of 1-[3-(2-chloro-10-phenothiazinyl)propyl]-4-ethoxycarbonylaminomethyl - 4-phenylpiperidine in 140 parts of ether is added portionwise, with stirring, to a suspension of 8 parts of lithium aluminum hydride in 1400 parts of ether. The resultant mixture is then refluxed and stirred for 23 hours and excess lithium aluminum hydride is decomposed by the cautious addition of ethanol. Concentrated potassium hydroxide is then added to further decompose the reaction mixture. The reaction mixture is then filtered to remove the inorganic salts and the filtrate is then washed with dilute potassium hydroxide solution before it is extracted with dilute hydrochloric acid. The acid extract is made alkaline and extracted with ether, and the ether solution is dried. The solvent is evaporated from the solution to leave a residual brown oil which is crude 1-[3-(2-chloro-10-phenothiazinyl)propyl]-4-aminomethyl-4 - phenylpiperidine. This compound has the following formula

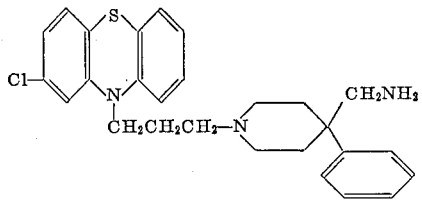

4 parts of the crude 1-[3-(2-chloro-10-phenothiazinyl)propyl]-4-aminomethyl-4-phenylpiperidine and 2 parts of maleic acid are mixed in 55 parts of ethanol and diluted with 20 parts of hexane. A white solid precipitates and this is separated and recrystallized from a mixture of methanol and ether to give the dimaleate salt of 1-[3-(2-chloro-10-phenothiazinyl)propyl]-4 - aminomethyl - 4 - phenylpiperidine melting at about 152–154° C.

What is claimed is:
1. A compound of the formula

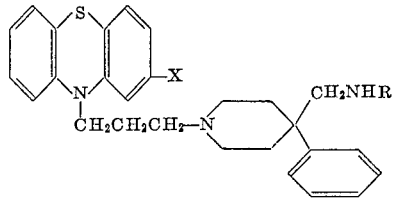

wherein X is selected from the group consisting of chlorine and lower alkanoyl and R is selected from the group consisting of hydrogen and (lower alkoxy)carbonyl.

2. A compound of the formula

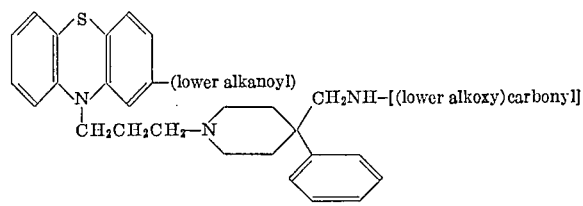

3. 1-[3-(2-propionyl-10 - phenothiazinyl)propyl]-4-ethoxycarbonylaminomethyl-4-phenylpiperidine.
4. 1-[3-(2-chloro-10-phenothiazinyl)propyl]-4 - aminomethyl-4-phenylpiperidine.

No references cited.

WALTER A. MODANCE, *Primary Examiner.*

JOHN D. RANDOLPH, *Assistant Examiner.*